(12) United States Patent
Schenk

(10) Patent No.: US 6,331,029 B1
(45) Date of Patent: Dec. 18, 2001

(54) DEVICE FOR DRIVING A FOLDING TOP FOR A CONVERTIBLE VEHICLE

(75) Inventor: Bernhard Schenk, Böblingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/525,912

(22) Filed: Mar. 15, 2000

(30) Foreign Application Priority Data

Mar. 16, 1999 (DE) .............................. 199 11 537

(51) Int. Cl.⁷ ...................................... B60J 7/08
(52) U.S. Cl. ..................... 296/122; 296/117; 296/115
(58) Field of Search .......................... 296/107.01, 109, 296/114, 122, 107.15, 107.16, 121, 116, 117, 112, 115

(56) References Cited

U.S. PATENT DOCUMENTS

| 5,052,740 | 10/1991 | Bauer et al. | 296/120.1 |
| 5,533,777 | * 7/1996 | Kleemann et al. | 296/117 |
| 5,645,309 | 7/1997 | Graf | 296/121 |
| 5,816,644 | 10/1998 | Rothe et al. | 296/107 |
| 5,829,821 | * 11/1998 | Aydt et al. | 296/122 |

FOREIGN PATENT DOCUMENTS

| 37 24 531 | 12/1988 | (DE) . |
| 39 37 764 | 11/1989 | (DE) . |
| 41 13 616 | 4/1991 | (DE) . |
| 44 23 834 | 7/1994 | (DE) . |

\* cited by examiner

Primary Examiner—Joseph D. Pape
Assistant Examiner—Jason Morrow
(74) Attorney, Agent, or Firm—Crowell & Moring, L.L.P.

(57) ABSTRACT

A device for driving a folding top for a convertible has at least one main bearing, which is at least indirectly connected to the vehicle body, at least one main pillar to which the folding top is attached and which is mounted in a rotatable manner on the at least one main bearing, at least one driving mechanism for driving the at least one main pillar, and a fabric-retaining bow for stretching the folding top when it is closed. The at least one main bearing has a connecting-link-type guide. The at least one main pillar is provided with a slot. The at least one driving mechanism has a bolt-like element which is intended to be accommodated in the connecting-link-type guide of the at least one main bearing and in the slot of the at least one main pillar. At least one additional lever is connected in an articulated manner via a pivot to the fabric-retaining bow, and the at least one additional lever has a recess on its side facing away from the pivot for the purpose of accommodating the bolt-like element.

19 Claims, 3 Drawing Sheets

DEVICE FOR DRIVING A FOLDING TOP FOR A CONVERTIBLE VEHICLE

BACKGROUND AND SUMMARY OF THE INVENTION

This application claims the priority of German Patent Document 199 11 537.0, filed Mar. 16, 1999, the disclosure of which is expressly incorporated by reference herein.

The invention relates to a device for driving a folding top for a cabriolet or convertible having at least one main bearing, which is at least indirectly connected to the vehicle body, at least one main pillar to which the folding top is attached and which is mounted in a rotatable manner on the at least one main bearing, at least one driving mechanism for driving the at least one main pillar, and a fabric-retaining bow for stretching the folding top when it is closed.

A device of the generic type is disclosed in German Patent Document DE 39 37 764 C1. In this case, the main pillar is driven by a toothed wheel via an adjusting cylinder, an additional kinematic arrangement and a further lever being necessary in order to drive the fabric-retaining bow.

A further device of this type is disclosed in German Patent Document DE 41 13 616 C1. In this arrangement, the intention is for the main pillar and the fabric-retaining bow to be driven by a single driving device. However, an additional fastening is required in order to lock the fabric-retaining bow to the lid of the folding-top compartment. Furthermore, a separate actuating mechanism is also required for this additional fastening, which in addition makes a more complicated control system necessary.

Furthermore, German Patent Document DE 44 23 834 C1 describes a device for driving a folding top, in which the fabric-retaining bow likewise has to have a fastening, which has to be activated in a corresponding manner.

All of these devices from the publications mentioned above, however, are united by having a very complicated structure which is thus susceptible to faults and which moreover causes relatively high costs.

In addition, the general prior art discloses folding-top systems having fabric-retaining bows in accordance with the principle of stay rods. In this case, the fabric-retaining bow is stretched through a position beyond the dead center, but it is not possible to lock the said bow in place.

An object of the present invention is therefore to provide a device for driving a folding top of a cabriolet or convertible having a design which is as simple as possible and which has just one driving mechanism for both the main pillar and the fabric-retaining bow. The intention here is to ensure reliable operation with a control system which is not complicated.

According to the invention, this object is achieved by providing an arrangement wherein the at least one main bearing has a connecting-link-type guide,
  wherein at least one main pillar is provided with a slot,
  wherein the at least one driving mechanism has a bolt-like element which is configured to be accommodated in the connecting-link-type guide of the at least one main bearing and in the slot of the at least one main pillar,
  wherein at least one additional lever is connected in an articulated manner via a first pivot to the fabric-retaining bow, and
  wherein the at least one additional lever has a recess on its side facing away from the first pivot for the purpose of accommodating the bolt-like element.

The invention results in the device for driving the folding top obtaining a kinematically very functional structure, as the result of which reliable operation is ensured when the folding top is opened and closed.

The driving mechanism controls the main pillar and the fabric-retaining bow in a constrained manner by means of the connecting-link-type guide and the elements which interact with the latter. As a result, the fabric-retaining bow does not require a separate driving mechanism and a separate control system. In addition, a very simple locking of the fabric-retaining bow via the driving mechanism is advantageously possible.

Other objects, advantages and novel features of the present invention will become apparent from the following detailed description of the invention when considered in conjunction with the accompanying drawings.

DETAILED DESCRIPTION OF THE DRAWINGS

Figure 1:
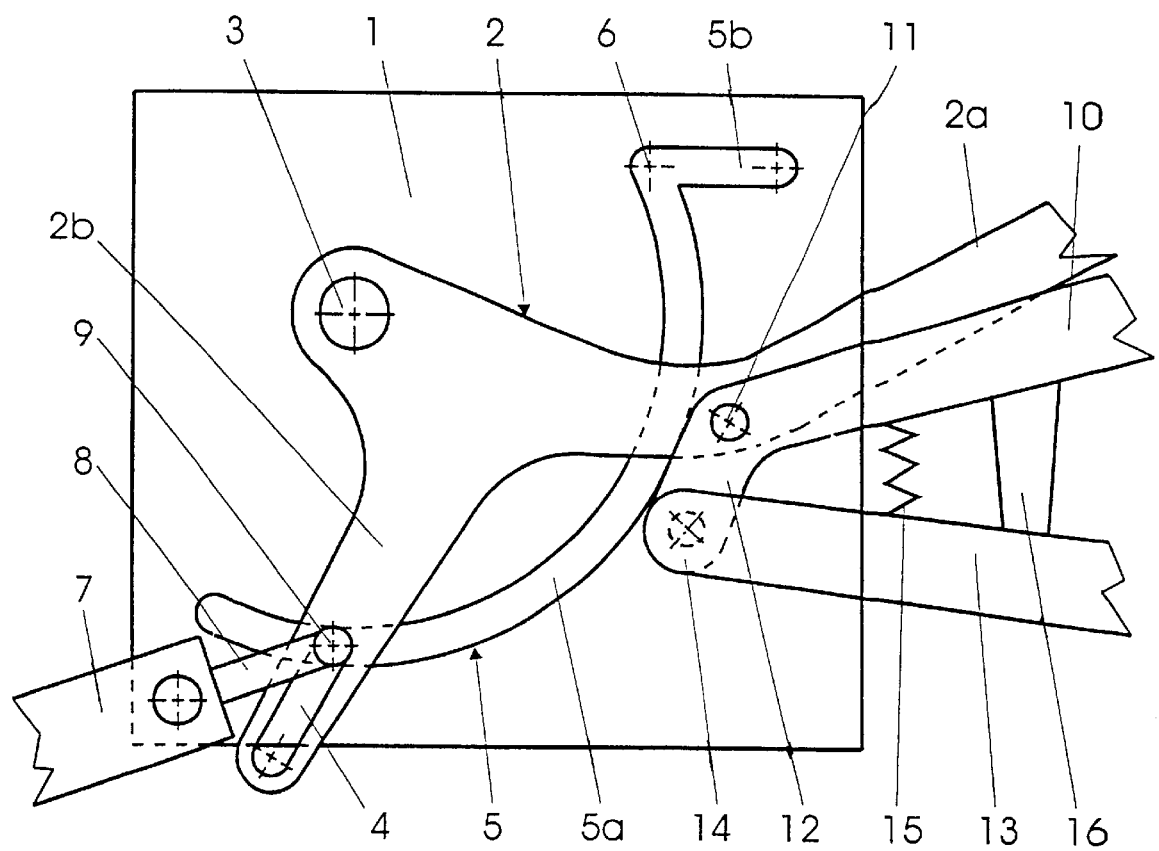
FIG. 1 shows a device for driving a folding top of a convertible, constructed according to a preferred embodiment of the invention and shown with the folding top put away.

FIG. 1 shows a main bearing 1 which is connected (in a manner which is not illustrated) to a cabriolet body (which is likewise not illustrated). A main pillar 2 is attached in an articulated manner to the main bearing 1 at a pivot 3. A folding top is fastened to the main pillar 2 in a manner which is known and is therefore not illustrated, a main part 2a of the main pillar forming a C-pillar of the vehicle. FIG. 1 shows the folding top when put away. A main bearing 1 and a main pillar 2 are in each case arranged on both sides of the vehicle for the folding top, but only one side is illustrated, for reasons of clarity. However, the description in the following text applies to the structure of the main bearing 1 and of the main pillar 2 on the other side of the vehicle.

Starting from the pivot 3, the main pillar 2 has an extension arm 2b which is opposite the main part 2a and in which a slot 4 is located. The extension arm 2b is that part of the main pillar 2 to which the folding top is not fastened. The main bearing 1 is provided with a connecting-link-type guide 5, which is constructed from two connected parts 5a and 5b. 5a is a curved part which describes a radius around the pivot 3 as the central point in the present case, and 5b is a slot into which the curved part 5a merges at a transition point 6.

A driving mechanism, which is designed as a hydraulic cylinder 7, is connected to the main pillar 2, specifically in such a manner that a bolt-like element 9 is mounted on a piston rod 8 of the hydraulic cylinder 7. The bolt-like element 9 penetrates both the slot 4 of the main pillar 2 and the connecting-link-type guide of the main bearing 1. In this manner, the bolt-like element 9, and therefore the hydraulic cylinder 7, is constantly connected to the main pillar 2 and the main bearing 1, and so when the piston rod 8 is extended out of the hydraulic cylinder 7, the bolt-like element 9 moves in the connecting-link-type guide 5. As it moves, the main pillar 2 is entrained and the latter rotates around the pivot 3. In order to make this possible, the hydraulic cylinder is connected in an articulated manner to the body (in a manner which is not illustrated). As an alternative to the hydraulic cylinder 7, a pneumatic cylinder, an electric motor or a similar, suitable mechanism could also be provided as the driving mechanism 7.

A fabric-retaining bow 10 is attached to the main pillar 2 at a pivot 11. On the opposite side of the pivot 11 the fabric-retaining bow 10 continues in a lever arm 12, to which an additional lever 13 is attached via a pivot 14.

If the hydraulic cylinder 7 is actuated and the piston rod 8 extended, the main pillar 2 rotates around the pivot 3 and entrains the fabric-retaining bow 10. For this purpose, the additional lever 13 is connected via a spring mechanism 15, in this case a tension spring 15, and via a stop element 16 to the fabric-retaining bow 10. The spring mechanism 15 could also be a torsion spring 15' shown in phantom in FIG. 1 which acts on the pivot 14 and which presses the additional lever 13 onto the stop element 16 in the direction of the fabric-retaining bow 10. The fabric-retaining bow 10 can be rotated as desired on the pivot 11 and its position is primarily influenced by the folding-top fabric.

Figure 2:
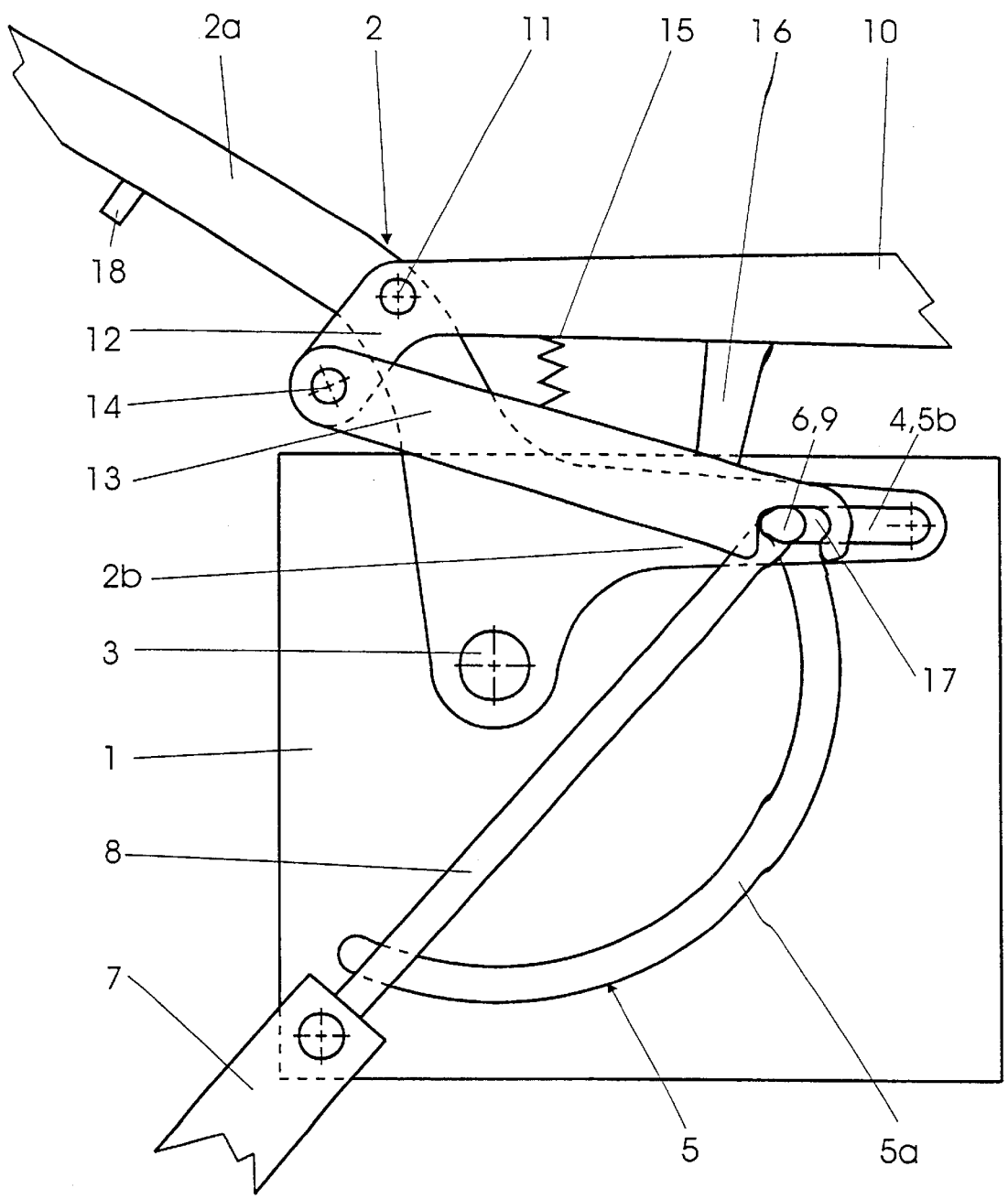
FIG. 2 shows the device according to the invention from FIG. 1 with the folding top and the fabric-retaining bow closed.

FIG. 2 is an illustration of when the bolt-like element 9 is located at the transition point 6 of the connecting-link-type guide 5. At this point, a recess 17 in the additional lever 13, which recess is located on the side opposite the pivot 14, is located exactly at the transition point 6, and so the bolt-like element 9 also engages in the recess 17 of the additional lever 13. Further extension of the piston rod 8 then causes the bolt-like element 9 to move in the slot 5b of the main bearing 1 and in the slot 4 of the main pillar 2.

For this purpose, the slot 4 of the main pillar 2 and the slot 5b of the main bearing 1 lie congruently one above the other, as a result of which the movement of the bolt-like element 9 in the connecting-link-type guide 5 has no effect on the main pillar 2, since the said element moves in the slot 4 under virtually no load. However, this movement causes the additional lever 13 to be entrained in the longitudinal direction of the slot 5b, because of the recess 17 and the bolt-like element 9 engaging in it. This leads to a force-controlled rotational movement of the fabric-retaining bow 10 around the pivot 11, since the lever arm 12 of the fabric-retaining bow 10 is entrained by the additional lever 13 and accordingly rotates the fabric-retaining bow 10 around the pivot 11. The fabric-retaining bow 10 is thereby raised completely into the position illustrated in FIG. 3. The main pillar 2 is unable to move further, since it bears, in the open position of the folding top, against a final stop element 18 which is fixed on the body.

Figure 3:
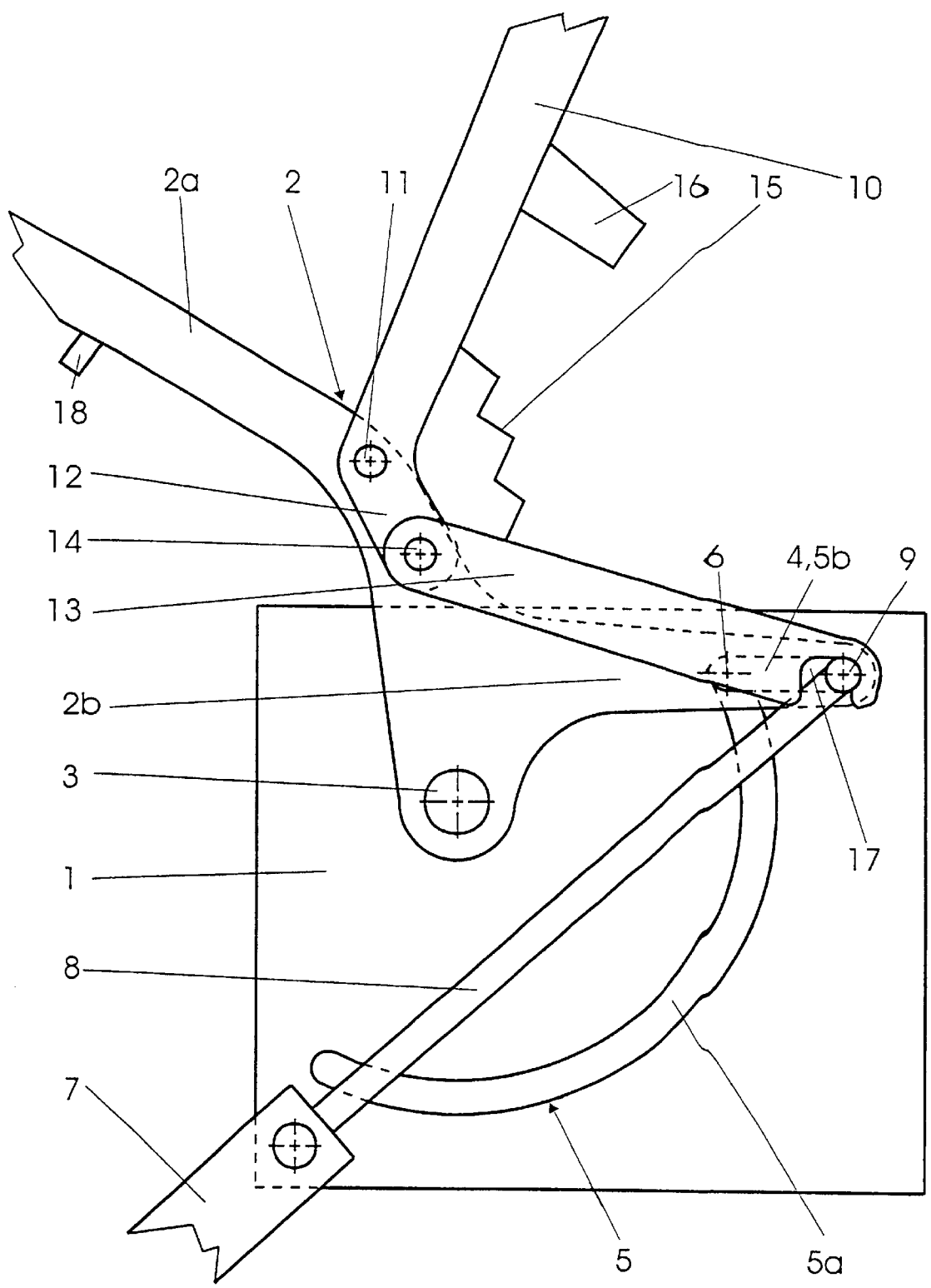
FIG. 3 shows the device according to the invention from FIG. 1 and FIG. 2 with the folding top closed, but with the fabric-retaining bow open.

FIG. 3 shows the piston rod 8 when completely extended, the fabric-retaining bow 10 being located in the abovementioned, raised position. This position is necessary so that a folding-top compartment lid (not illustrated) can be brought under the fabric-retaining bow 10 and can be closed. After the folding-top compartment lid is closed, the hydraulic cylinder 7 reverses its direction, i.e. the piston rod 8 is retracted. As a result, the additional lever 13 is also moved back and owing to the lever arm 12 rotates the fabric-retaining bow 10 back around the pivot 11, specifically until it lies in that position which has already been illustrated in FIG. 2. In this position, the hydraulic cylinder can be locked and can therefore cause the main pillar 2 and the fabric-retaining bow 10 to be blocked. This illustration therefore also shows the folding top when it is completely closed.

The folding top is put away in the reverse sequence, in which likewise the fabric-retaining bow 10 is first of all lifted up, in order to be able to open the folding-top compartment lid. At the transition point 6 in the connecting-link-type guide 5, the recess 17 then releases the bolt-like element 9 and the fabric-retaining bow 10 can again rotate freely around the pivot 11.

Deviating from the embodiment illustrated, the design of the connecting-link-type guide 5 can also be adapted to the requirements of the particular folding top with regard to the necessary kinetic energy. For example, an embodiment having a straight beginning and an adjoining arcuate form is conceivable.

Deviating from the design illustrated, the fabric-retaining bow 10 can also be connected via an intermediate kinematic arrangement directly to the main bearing 1 at a pivot (not illustrated). By this means, the fabric-retaining bow 10 remains at the same location in the first phase of the movement of the main pillar 2 and is moved around the pivot by the folding-top fabric. In an embodiment of this type, the additional lever 13 would also be directly connected to the main bearing 1. However, in this arrangement the movement explained above of the fabric-retaining bow 10 from the transition point 6 would not change.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Device for driving a folding top for a convertible, having at least one main bearing, which is at least indirectly connected to the vehicle body, at least one main pillar to which the folding top is attached and which is mounted in a rotatable manner on the at least one main bearing, at least one driving mechanism for driving the at least one main pillar, and a fabric-retaining bow for stretching the folding top when it is closed, wherein the at least one main bearing has a connecting-link-type guide, wherein the at least one main pillar is provided with a slot, wherein the at least one driving mechanism has a bolt-like element which is configured to be accommodated in the connecting-link-type guide of the at least one main bearing and in the slot of the at least one main pillar, wherein at least one additional lever is connected in an articulated manner via a first pivot to the fabric-retaining bow, and wherein the at least one additional lever has a recess on its side facing away from the first pivot for the purpose of accommodating the bolt-like element.

2. Device according to claim 1, wherein the fabric-retaining bow is connected via a second pivot to the main pillar and can be driven by the driving mechanism.

3. Device according to claim 2, wherein a lever arm is formed between the second pivot via which the fabric-retaining bow is connected to the main pillar or to the main bearing, and the first pivot via which the additional lever is connected to the fabric-retaining bow.

4. Device according to claim 1, wherein the connecting-link-type guide in the main bearing is divided into a curved part and a slot branching off therefrom at a transition point.

5. Device according to claim 4,
wherein the recess in the additional lever is made in such a manner that it is situated, at least approximately at the same time as the bolt-like element, at the transition point from the curved part to the slot of the connecting-link-type guide.

6. Device according to claim 4,
wherein, when the folding top is closed, the slot of the main pillar and the slot of the connecting-link-type guide lie at least approximately congruently one above the other in the main bearing.

7. Device according to claim 5.
wherein, when the folding top is closed, the slot of the main pillar and the slot of the connecting-link-type guide lie at least approximately congruently one above the other in the main bearing.

8. Device according to claim 1,
wherein the slot is situated in an extension arm of the main pillar.

9. Device according to claim 6,
wherein the slot is situated in an extension arm of the main pillar.

10. Device according to claim 1,
wherein the additional lever is connected via a spring mechanism and a stop element to the fabric-retaining bow.

11. Device according to claim 10,
wherein the spring mechanism is designed as a tension spring.

12. Device according to claim 10,
wherein the spring mechanism is designed as a torsion spring arranged on the pivot.

13. Device according to claim 1,
wherein the driving mechanism is designed as a hydraulic cylinder having a piston rod, the bolt-like element being arranged on the piston rod.

14. Device according to claim 2,
wherein the driving mechanism is designed as a hydraulic cylinder having a piston rod, the bolt-like element being arranged on the piston rod.

15. Device according to claim 4,
wherein the curved part of the connecting-link-type guide extends around a pivot connection of the main pillar to the main bearing as an at least approximately uniform circular path.

16. Device according to claim 5,
wherein the curved part of the connecting-link-type guide extends around a pivot connection of the main pillar to the main bearing as an at least approximately uniform circular path.

17. Device according to claim 6,
wherein the curved part of the connecting-link-type guide extends around a pivot connection of the main pillar to the main bearing as an at least approximately uniform circular path.

18. Device according to claim 1,
wherein a final stop element for the main pillar is attached to the body.

19. A convertible folding top driving device comprising:

a main bearing which in use is connected to a vehicle body, a main pillar which in use is attached with a folding top, said main pillar being pivotally connected to the main bearing, a fabric retaining bow operable to stretch the folding top when in a vehicle closed position, said fabric retaining bow being pivotally connected to the main pillar at a first pivot, an additional lever pivotally connected to the fabric retaining bow at a second pivot spaced from the first pivot, a connecting link guide slot in the main bearing, a control slot in the main pillar, and a drive mechanism including a bolt which extends through the connecting link guide slot and the control slot and is operable to move the main pillar between top open and closed positions, wherein said additional lever includes a section engageable with the bolt when the bolt is in a predetermined section of the link guide slot to thereby cause relative pivotal movement of the main pillar and fabric retaining bow about the first pivot.

* * * * *